United States Patent
Krivokapic

(10) Patent No.: US 7,020,224 B2
(45) Date of Patent: Mar. 28, 2006

(54) ULTRA-WIDEBAND CORRELATING RECEIVER

(75) Inventor: Ivan Krivokapic, San Diego, CA (US)

(73) Assignee: Pulse—LINK, Inc., Carlsbad, CA (US)

( * ) Notice: Subject to any disclaimer, the term of this patent is extended or adjusted under 35 U.S.C. 154(b) by 95 days.

(21) Appl. No.: 10/676,449

(22) Filed: Sep. 30, 2003

(65) Prior Publication Data

US 2005/0069062 A1    Mar. 31, 2005

(51) Int. Cl.
*H03D 1/00* (2006.01)
*H04L 27/06* (2006.01)

(52) U.S. Cl. ..................................... 375/343
(58) Field of Classification Search ............... 375/343, 375/346, 239
See application file for complete search history.

(56) References Cited

U.S. PATENT DOCUMENTS

| | | | |
|---|---|---|---|
| 3,728,632 A | | 4/1973 | Ross |
| 3,906,453 A * | | 9/1975 | Mattedi et al. ............. 711/107 |
| 4,270,209 A * | | 5/1981 | Albanese .................... 375/343 |
| 4,641,317 A | | 2/1987 | Fullerton |
| 4,813,057 A | | 3/1989 | Fullerton |
| 4,846,920 A * | | 7/1989 | Keller et al. ........... 156/345.25 |
| 4,979,186 A | | 12/1990 | Fullerton |
| 5,291,202 A * | | 3/1994 | McClintock ................. 342/16 |
| 5,677,927 A | | 10/1997 | Fullerton et al. |
| 5,920,278 A * | | 7/1999 | Tyler et al. .................... 342/33 |
| 6,160,259 A * | | 12/2000 | Petrillo et al. ......... 250/363.07 |
| 6,378,080 B1 * | | 4/2002 | Anjo et al. .................. 713/500 |
| 6,505,032 B1 * | | 1/2003 | McCorkle et al. ......... 455/41.2 |
| 6,529,568 B1 * | | 3/2003 | Richards et al. ............ 375/346 |
| 6,822,508 B1 * | | 11/2004 | Yoon et al. .................. 329/319 |
| 6,850,733 B1 * | | 2/2005 | McCorkle et al. ......... 455/41.2 |
| 2003/0054764 A1 | | 3/2003 | McCorkle et al. |
| 2003/0093447 A1 * | | 5/2003 | Hwang ........................ 708/312 |
| 2003/0095609 A1 * | | 5/2003 | Cowie et al. ................ 375/316 |
| 2003/0096578 A1 | | 5/2003 | McCorkle et al. |
| 2004/0121728 A1 * | | 6/2004 | Gibson et al. ............. 455/12.1 |

FOREIGN PATENT DOCUMENTS

| WO | WO 01/73965 A2 | 10/2001 |
|---|---|---|
| WO | WO 01/76086 A2 | 10/2001 |
| WO | WO 01/93446 A2 | 12/2001 |

OTHER PUBLICATIONS

Moe Z. Win, Robert A. Scholtz, "Energy Capture vs. Correlator Resources in Ultra-Wide Bandwidth Indoor Wireless Communications Channels," Communication Sciences Institute, Department of Electrical Engineering-Systems, University of Southern California, Los Angeles, CA 90089-2565 USA.

(Continued)

*Primary Examiner*—Stephen Chin
*Assistant Examiner*—Jia Lu
(74) *Attorney, Agent, or Firm*—Pulse—LINK, Inc.; Peter R Martinez; Steven A Moore

(57) ABSTRACT

A receiver for ultra-wideband communications is provided. One feature of the receiver architecture is that includes only a single correlator. The receiver may be used in wireless and wire communication mediums. The single correlator may be used to update a locally generated signal based on an incoming signal and detect data. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

24 Claims, 10 Drawing Sheets

OTHER PUBLICATIONS

V. Srinivasa Somayazulu, Jeffrey R. Foerster and Sumit Roy, "Design Challenges for Very High Data Rate UWB Systems," Intel Labs., 2111 N.E. 25th Ave., Hillsboro, OR 97124-5961 USA.

Robert Fleming, Cherie Kusher, "Integrated, Low-Power, Ultra-Wideband Transceivers for Distributed Position Location and Communication", Semi-Annual Technical Report Contract J-BFI-94-058, Aether Wire & Location, Inc. Jul. 1995, Nicasio, CA, USA.

Robert Fleming, Cherie Kusher, "Low-Power, Miniature, Distributed Position Location and Communication Devices Using Ultra-Wideband, Nonsinusoidal Communication Technology", Semi-Annual Technical Report Contract J-BFI-94-058, Aether Wire & Location, Inc. Jul. 1995, Nicasio, CA, USA.

David G. Leeper, "Wireless Data Blaster", Scietific American, vol. 286, No. 5, May 2002, pp. 64-9, USA.

* cited by examiner

ULTRA-WIDEBAND CORRELATING RECEIVER

FIELD OF THE INVENTION

The present invention generally relates to ultra-wideband communications. More particularly, the invention concerns an apparatus for receiving and demodulating ultra-wideband electromagnetic pulses for wire and wireless communications.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as movies-on-demand and video teleconferencing demand high data transmission rates. Another example is interactive video in homes and offices. Moreover, traffic across the Internet continues to increase, and with the introduction of new applications, such as the convergence of voice and Internet data, traffic will only increase at a faster rate. Consequently, carriers and service providers are overhauling the entire network infrastructure—including switches, routers, backbone, and the last mile (i.e., the local loop)—in an effort to provide more bandwidth.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. The need for more bandwidth is evidenced by user complaints of slow Internet access and dropped data links that are symptomatic of network overload.

Therefore, there exists a need for a method to increase the bandwidth of wired network or communication system, as well as a wireless network or communication system.

SUMMARY OF THE INVENTION

The present invention provides an apparatus for receiving and demodulating an ultra-wideband signal. The receiver may be configured to work in conjunction with wireless or wire communications mediums, whether the medium is twisted-pair wire, coaxial cable, fiber optic cable, or other types of wire media.

One feature of the present invention is it provides a receiver with demodulation capability of amplitude-, phase-, and timing-based modulation schemes. Another feature of the present invention is that it uses only a single correlator to detect and demodulate ultra-wideband pulses.

These and other features and advantages of the present invention will be appreciated from review of the following detailed description of the invention, along with the accompanying figures in which like reference numerals refer to like parts throughout.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the present invention throughout this document does not mean that all claimed embodiments or methods must include the referenced feature(s).

The present invention provides a method of receiving and demodulating a plurality of electromagnetic ultra-wideband (UWB) pulses. The pulses can be transmitted and received wirelessly, or through any wire medium, whether the medium is twisted-pair wire, coaxial cable, fiber optic cable, hybrid fiber-coax, or other type of wire media.

The UWB pulse reception and demodulation method of the present invention enables the simultaneous coexistence of the ultra-wideband pulses with conventional carrier-wave signals. Thus, the methods of the present invention enable an increase in the bandwidth, or data rates of a communication system.

Figure 1:
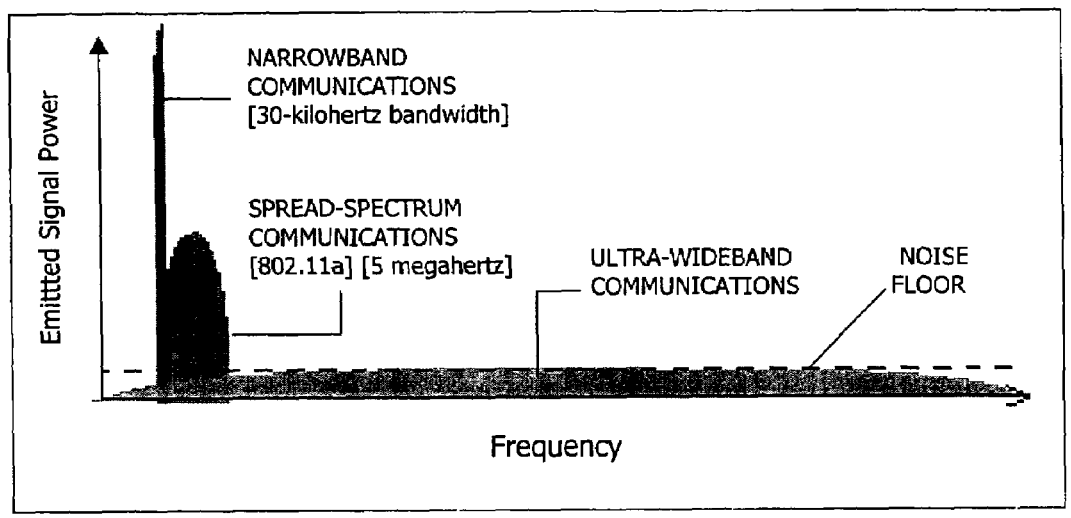
FIG. 1 is an illustration of different communication methods.
Figure 2:
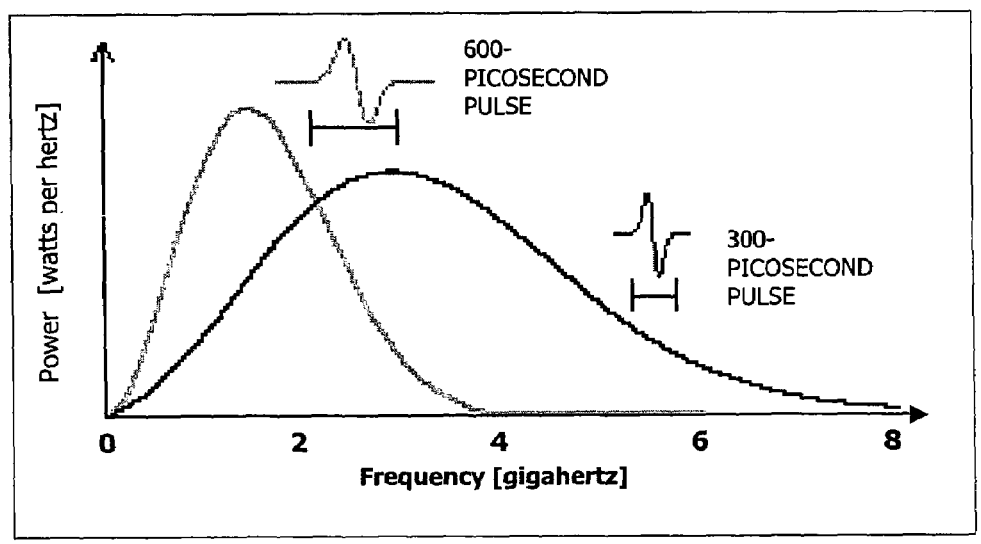
FIG. 2 is an illustration of two ultra-wideband pulses.

Referring to FIGS. 1 and 2, ultra-wideband (UWB) communication technology employs pulses of electromagnetic energy that are emitted at, for example, nanosecond or picosecond intervals (generally tens of picoseconds to a few nanoseconds in duration). For this reason, ultra-wideband is often called "impulse radio." That is, the UWB pulses are transmitted without modulation onto a sine wave carrier frequency, in contrast with conventional radio frequency technology as described above. A UWB pulse is a single electromagnetic burst of energy. That is, a UWB pulse may be a single positive burst of electromagnetic energy, a single negative burst of electromagnetic energy or a single burst of electromagnetic energy with a predefined phase.

Alternate implementations of UWB can be achieved by mixing baseband pulses with a carrier wave that controls a center frequency of a resulting UWB signal. Ultra-wideband generally requires neither an assigned frequency nor a power amplifier.

An example of a conventional radio frequency technology is illustrated in FIG. 1. IEEE 802.11a, a wireless local area network (LAN) protocol, transmits radio frequency signals at a 5 GHz center frequency, with a radio frequency spread of about 5 MHz. A UWB pulse may have a 2.0 GHz center frequency, with a frequency spread of approximately 4 GHz, as shown in FIG. 2, which illustrates two typical UWB pulses. FIG. 2 illustrates that the shorter the UWB pulse in time, the broader the spread of its frequency spectrum. This is because bandwidth is inversely proportional to the time duration of the pulse. A 600-picosecond UWB pulse can have about a 1.8 GHz center frequency, with a frequency spread of approximately 1.6 GHz and a 300-picosecond UWB pulse can have about a 3 GHz center frequency, with a frequency spread of approximately 3.2 GHz. Thus, UWB pulses generally do not operate within a specific frequency, as shown in FIG. 1. Because UWB pulses are spread across an extremely wide frequency range, UWB communication systems allow communications at very high data rates, such as 100 megabits per second or greater. According to one embodiment of the invention, the transmitter may be configured to transmit both carrier-wave signals and UWB signals. The carrier-wave signals and the UWB signals may be transmitted substantially simultaneously. The transmitter may include a carrier-wave transmitter portion that enables carrier-wave signals to be transmitted. A single antenna may be used for transmitting both the carrier-wave signals and the UWB signals.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by reference.

Also, because a UWB pulse is spread across an extremely wide frequency range, the power sampled at a single, or specific frequency is very low. For example, a UWB one-watt pulse of one nano-second duration spreads the one-watt over the entire frequency occupied by the UWB pulse. At any single frequency, such as at the carrier frequency of a CATV provider, the UWB pulse power present is one nano-watt (for a frequency band of 1 GHz). This is calculated by dividing the power of the pulse (i.e., 1 watt) by the frequency band (i.e., 1 billion Hertz). This is well within the noise floor of any communications system and therefore does not interfere with the demodulation and recovery of the signals transmitted by the CATV provider. Generally, a multiplicity of UWB pulses are transmitted at relatively low power (when sampled at a single, or specific frequency), for example, at less than −30 power decibels to −60 power decibels, which reduces interference with conventional radio frequencies. UWB pulses, however, transmitted through many wire media typically do not interfere with wireless radio frequency transmissions. Therefore, the power (sampled at a single frequency) of UWB pulses transmitted though wire media may range from about +30 dBm to about −140 dBm.

The present invention may be employed in any type of network, be it wireless, wire, or a mix of wire media and wireless components. That is, a network may use both wire media, such as coaxial cable, and wireless devices, such as satellites, or cellular antennas. As defined herein, a network is a group of points or nodes connected by communication paths. The communication paths may be use wires or be wireless. A network as defined herein may interconnect with other networks and contain sub-networks. A network as defined herein may be characterized in terms of a spatial distance, for example, such as a local area network (LAN), a personal area network (PAN), a metropolitan area network (MAN), a wide area network (WAN), and a wireless personal area network (WPAN), among others. A network as defined herein may also be characterized by the type of data transmission technology in use on it, for example, a Transmission Control Protocol/Internet Protocol (TCP/IP) network, and a Systems Network Architecture network, among others. A network as defined herein may also be characterized by whether it carries voice signals, data signals, or both. A network as defined herein may also be characterized by users of the network, such as, for example, users of a public switched telephone network (PSTN) other type of public networks, and private networks (such as within a single room or home), among others. A network as defined herein may also be characterized by the usual nature of its connections, for example, a dial-up network, a switched network, a dedicated network, and a non-switched network, among others. A network as defined herein may also be characterized by the types of physical links that it employs, for example, optical fiber, coaxial cable, a mix of both, unshielded twisted pair, and shielded twisted pair, among others.

The present invention may also be employed in any type of wireless network, such as a wireless PAN, LAN, MAN, or WAN. The present invention may be implemented in a "carrier free" architecture, which does not require the use of high frequency carrier generation hardware, carrier modulation hardware, stabilizers, frequency and phase discrimination hardware or other devices employed in conventional frequency domain communication systems. The present invention dramatically increases the bandwidth of conventional networks that employ wire media, but can be inexpensively deployed without extensive modification to the existing wire media network.

In one embodiment, the present invention may provide increased bandwidth by injecting, or otherwise super-imposing an ultra-wideband (UWB) signal into an existing data signal and subsequently recovering the UWB signal at an end node, set-top box, subscriber gateway, or other suitable location.

One method practiced by the present invention involves recovery of phase-modulated data for an ultra-wideband receiver. An incoming signal may be a plurality of ultra-wideband (UWB) pulses wherein each of the pulses includes data encoded within a phase of the pulse. One method herein described initially estimates timing of the incoming signal with the use of a correlator and an energy estimator. In one embodiment of the present invention, the correlator may include a filter whose transfer function is matched to an output filter of a UWB transmitter. The matched filter shapes a locally generated pulse to closely represent an expected incoming signal. Additional components of the correlator may include a mixer, amplifier, and low-pass filter. The incoming signal may be correlated with a local template signal then sent to the energy estimator.

The energy estimator may include an absolute value detector such as a rectifier or a square law detector that outputs the square of the incoming signal. The function of the absolute value detector is to provide an energy pulse to an integrator. The integrator sums the signal across a finite time period and provides its output as a coarse timing signal to a local signal generator. This summed signal gives the receiver a coarse timing estimate of the incoming signal. This coarse signal is appropriate for detection and demodulation of position based signal modulation schemes such as Pulse Position Modulation.

Figure 3:
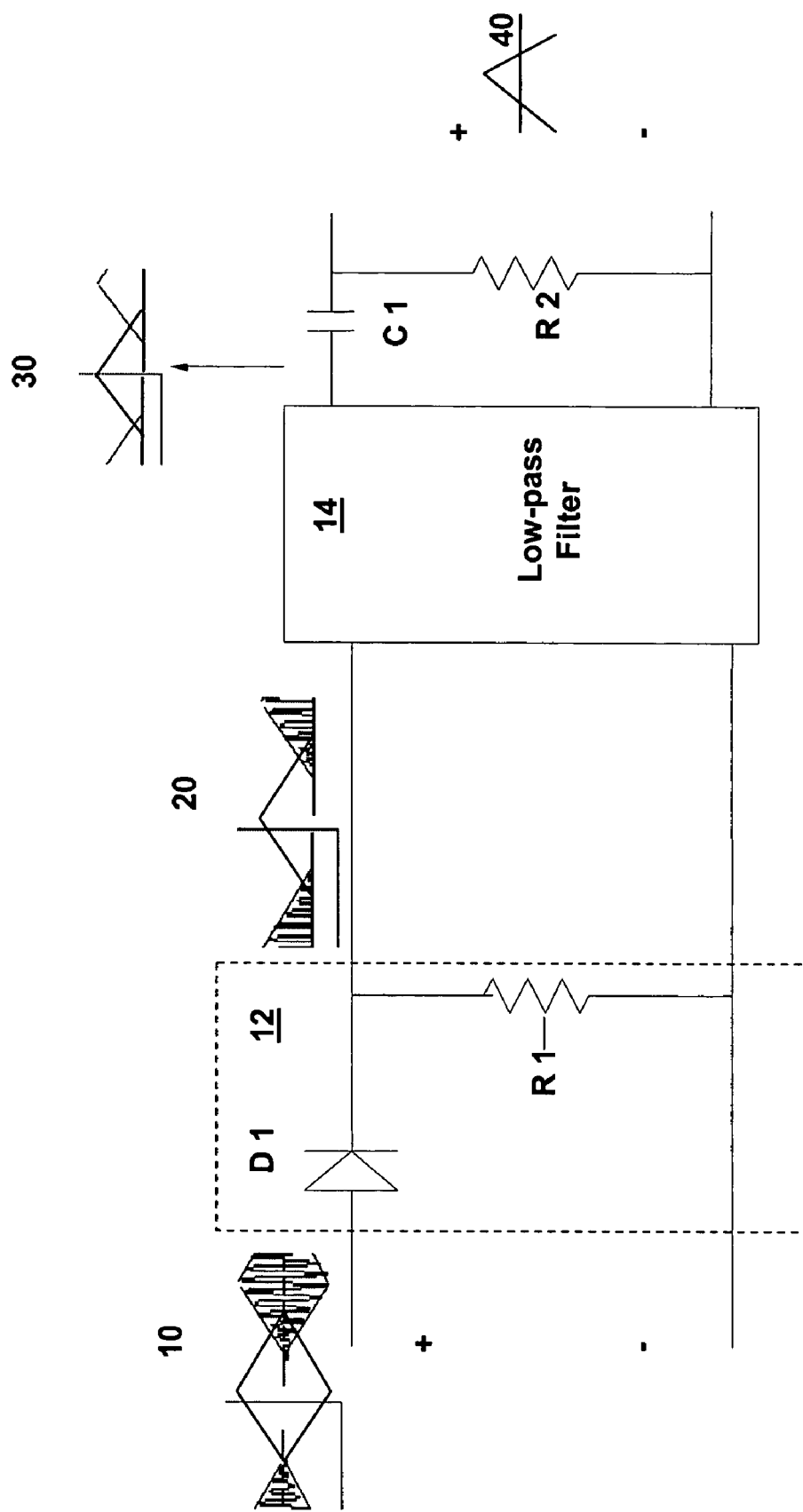
FIG. 3. is an illustration of a conventional non-coherent receiver architecture.

A number of receiver architectures are known in the art of ultra-wideband communications. These conventional architectures can be classified into two basic groups: coherent and non-coherent. One usual approach, as illustrated in FIG. 3, to non-coherent detection and demodulation involves the use of envelope detectors 12 to provide an output signal 40 that is representative of an incoming signal 10. The incoming signal 10 arrives at an envelope detector 12 that includes a resistor R1 and a Diode D1. A negative part of the incoming signal 10 is suppressed by the diode D1 and a half wave rectified signal 20 is developed across the resistor R1. The half-wave rectified signal 20 contains high frequency components that are attenuated by a low-pass filter 14. A resultant low frequency signal 30 is representative of the input signal but has a direct current (DC) offset. A capacitor C1 blocks the DC component of the signal 30 and the output signal 40 is developed across a resistor R2.

Non-coherent architectures have been used in the field of communications to receive and demodulate both amplitude-related signal modulation schemes, such as Amplitude Modulation (AM), dual sideband modulation, single sideband modulation, vestigial sideband modulation, as well as angle-related modulation schemes such as Frequency Modulation (FM) and Phase Modulation (PM).

Conventional UWB receivers, as described above, typically use two correlating chains. A correlating chain is a process for performing one or more functions. For example, a continuous time correlating chain includes an analog correlator that includes a product (or mixer) followed by an integrator. An incoming signal is multiplied by a locally generated signal and transmitted to an integrator that integrates and dumps the signal over a period of time.

One correlating chain is used to provide a coarse timing estimate of a pulse. The coarse timing estimate is used to dither the frequency and phase of a locally generated signal. A second correlating chain is used as a data detector to lock-in on a precise timing of the signal and a peak of the pulse.

According to one embodiment of the invention, a UWB receiver uses only a single correlator to estimate the coarse timing and also updates a locally generated signal for data detection. In another embodiment, the correlator may include an absolute value detector that receives output from a mixer and delivers inputs into an integrator. By using an absolute value detector in such a manner, this allows the integrator to integrate and dump over a wider range of time. In addition, the absolute value detector provides twice as much energy as typically transmitted to the integrator by adding a negative portion of the correlated signal (i.e., taking the absolute value of the signal) to the positive portion of the correlated signal. This is because conventional UWB receivers use a diode which prevents the negative portion of a correlated signal from being transmitted to the integrator. Thus, only half of a signal is used to obtain the coarse timing signal.

Figure 4:
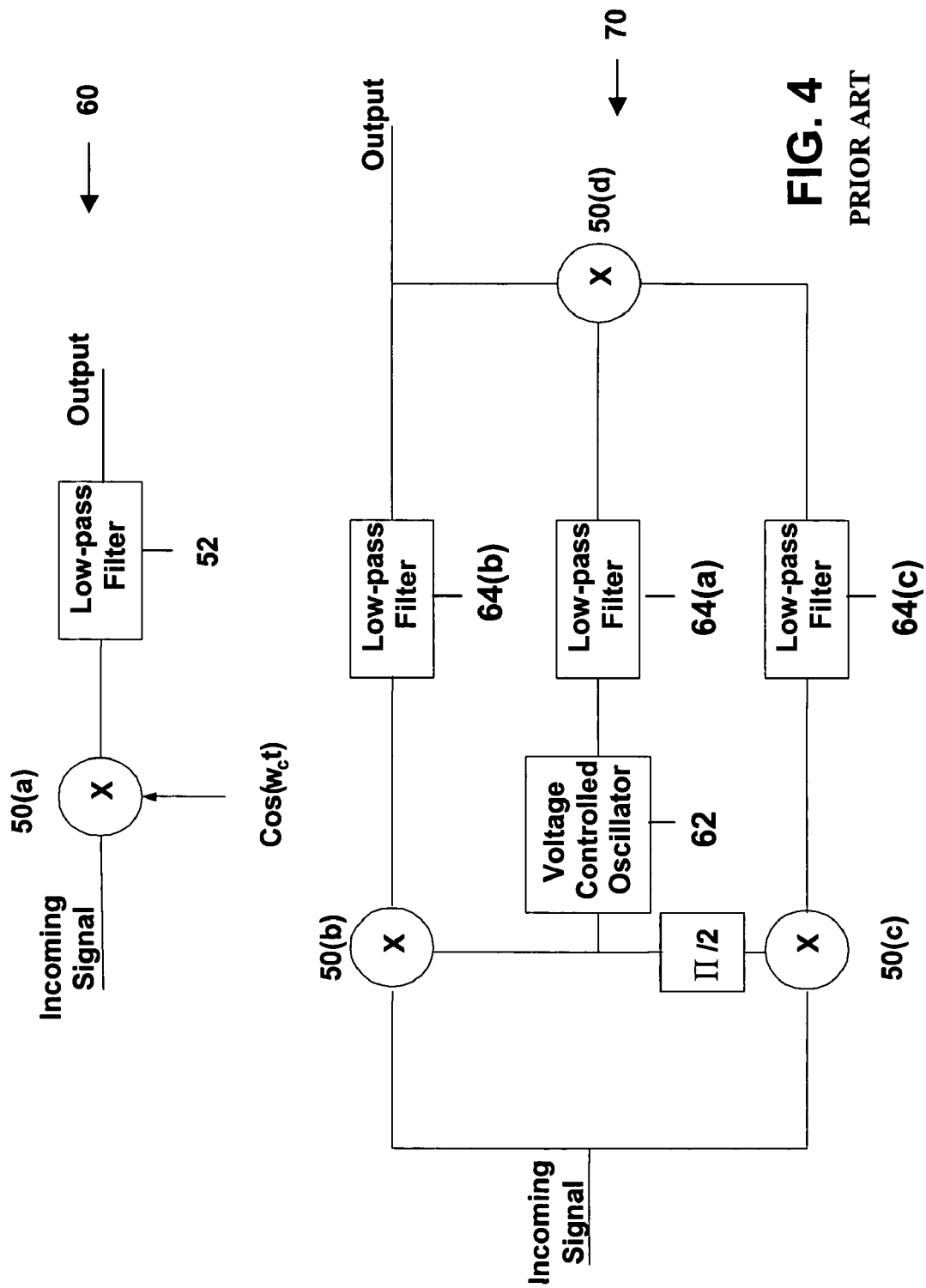
FIG. 4. is an illustration of two conventional coherent receiver architectures.

In communication systems having a transmitter that uses a signal modulation technique that does not include a carrier in a resultant spectrum, such as Dual Sideband Suppressed Carrier (DSBSC), a coherent detector is commonly used. A conventional coherent receiver architecture 60 is illustrated in FIG. 4. An incoming signal is multiplied by a locally generated signal $\cos(\omega_c t)$ using a mixer 50($a$). The locally generated signal is at the same frequency $\omega_c$ as a carrier of the incoming signal. The product of the incoming signal and the locally generated signal will have two components. Because the locally generated signal is at a carrier frequency, the first signal component will be low frequency or close to DC. The second signal component is at twice the carrier frequency. A low-pass filter 52 may be used to attenuate a high frequency component of the output signal.

Other coherent receiver architectures exist, such as a "Costas loop" architecture 70, illustrated in FIG. 4. In this architecture, a voltage controlled oscillator (VCO) 62 generates a local signal which is mixed with an incoming signal by a mixer 50($b$) to produce a first mixed signal. A copy of the local signal may be phase delayed by $\pi/2$ and mixed with the incoming signal by mixer 50($c$) to produce a second mixed signal. The mixed signals are then mixed to produce an error signal, which may then be transmitted through a low-pass filter 64($a$), 64($b$), 64($c$) to control the VCO 62. In this configuration, the first mixed signal is taken as an output.

A number of correlator designs, or architectures are used in ultra-wideband communications. In one architecture, two correlators are used. Each correlator includes a mixer and an integrator. A local template signal is generated and delayed with a delay element to produce a second template signal. The first template signal is correlated with an incoming signal. The incoming signal is additionally correlated with the delayed template signal. Either the first or second correlator provides a feedback signal to the template generator.

Figure 5:
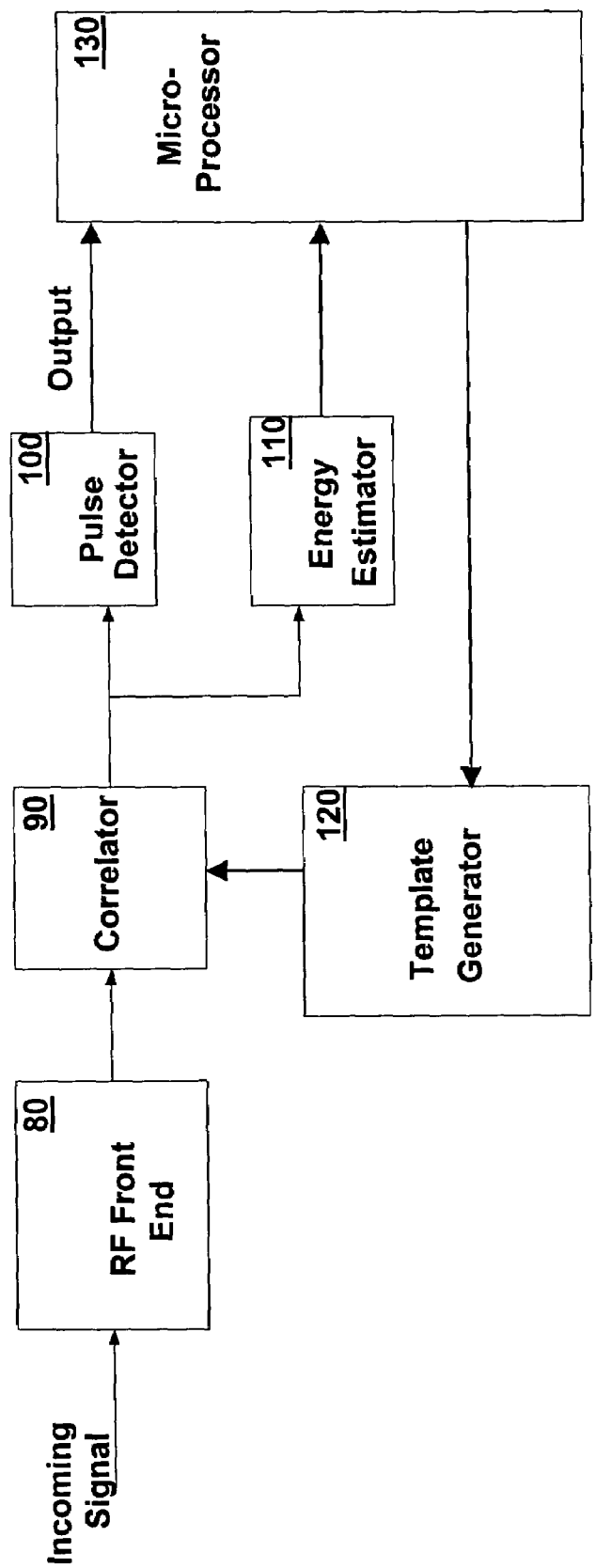
FIG. 5. is an illustration of the functional blocks of the present invention according to one embodiment of the invention.
Figure 6:
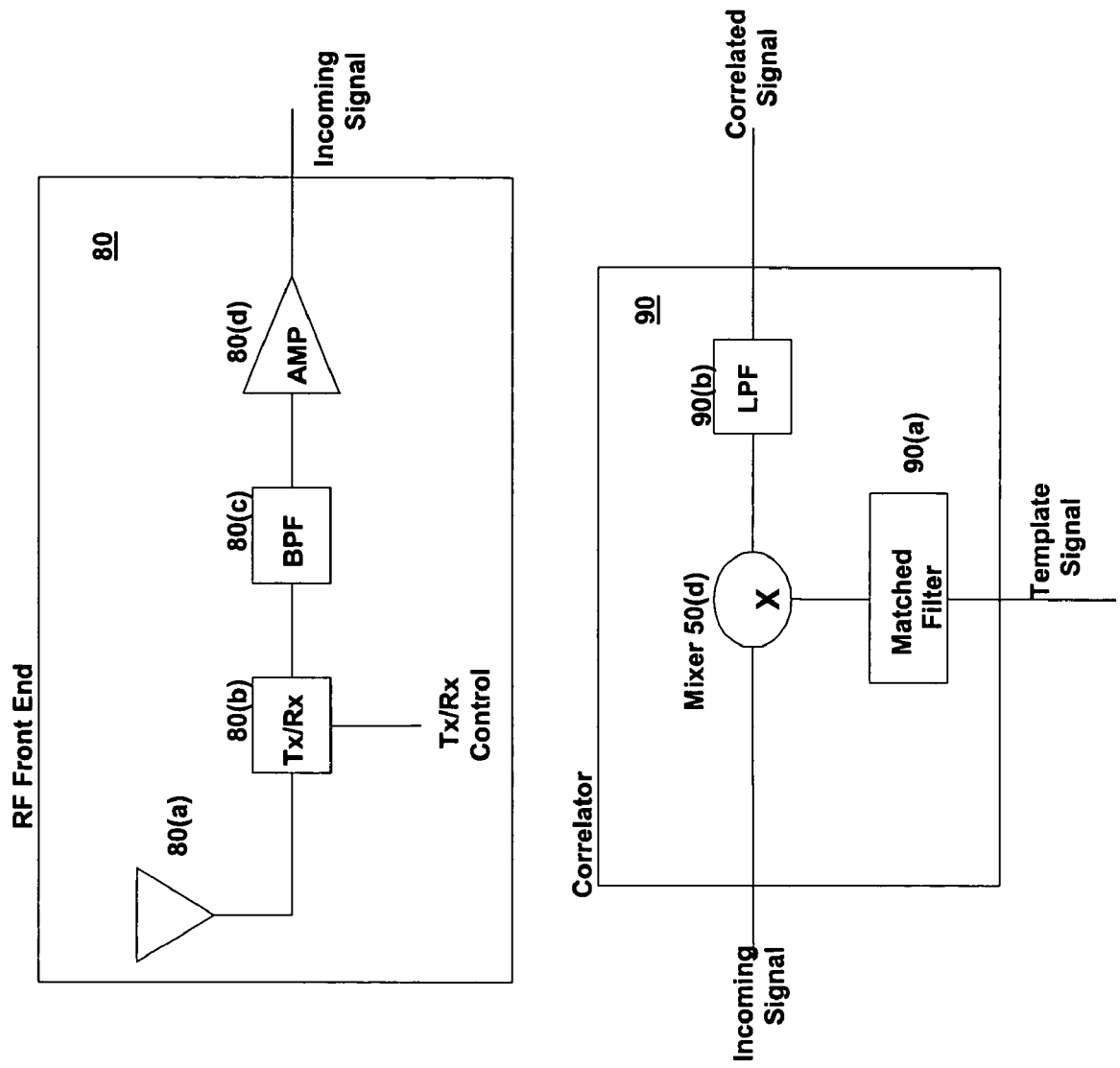
FIG. 6. is an illustration of an RF front end and correlator according to one embodiment of the invention.

FIGS. 5–8 illustrate an ultra-wideband correlating receiver constructed according to one embodiment of the present invention. An incoming signal is received at an RF front end 80. As shown in FIG. 6, the RF front end 80 may include an antenna 80($a$), a Transmit/Receive (TX/RX) switch 80($b$), at least one filter 80($c$), and at least one amplifier (AMP) 80($d$). The filter 80($c$) may be a band-pass filter (BPF) or a low-pass filter. The amplifier 80($d$) may be a low noise amplifier or an automatic gain control (AGC) amplifier.

As shown in FIGS. 5 and 6, the correlator 90 may include a mixer 50($d$), matched filter 90($a$), and low-pass filter (LPF) 90($b$). Additionally, there may be an optional amplifier in the correlator (not shown). The optional amplifier may be an AGC or low noise amplifier. The mixer 50($d$) multiplies the incoming signal by a locally generated template signal. The product of these signals has a high frequency component and a low frequency component. The high frequency component is attenuated by the low-pass filter 90($b$).

The matched filter 90($a$) is optional. When used, the matched filter 90($a$) may have a similar transfer function as an output filter in the transmitter sending the incoming signal. The matched filter 90($a$) shapes a locally generated coarse template signal to approximate an expected incoming signal. By approximating the incoming signal with the template signal, the correlator 90 outputs a better approximation of time of receipt and produces a better estimate of frequency, polarity or phase of the incoming signal, when compared to conventional devices.

Figure 7:
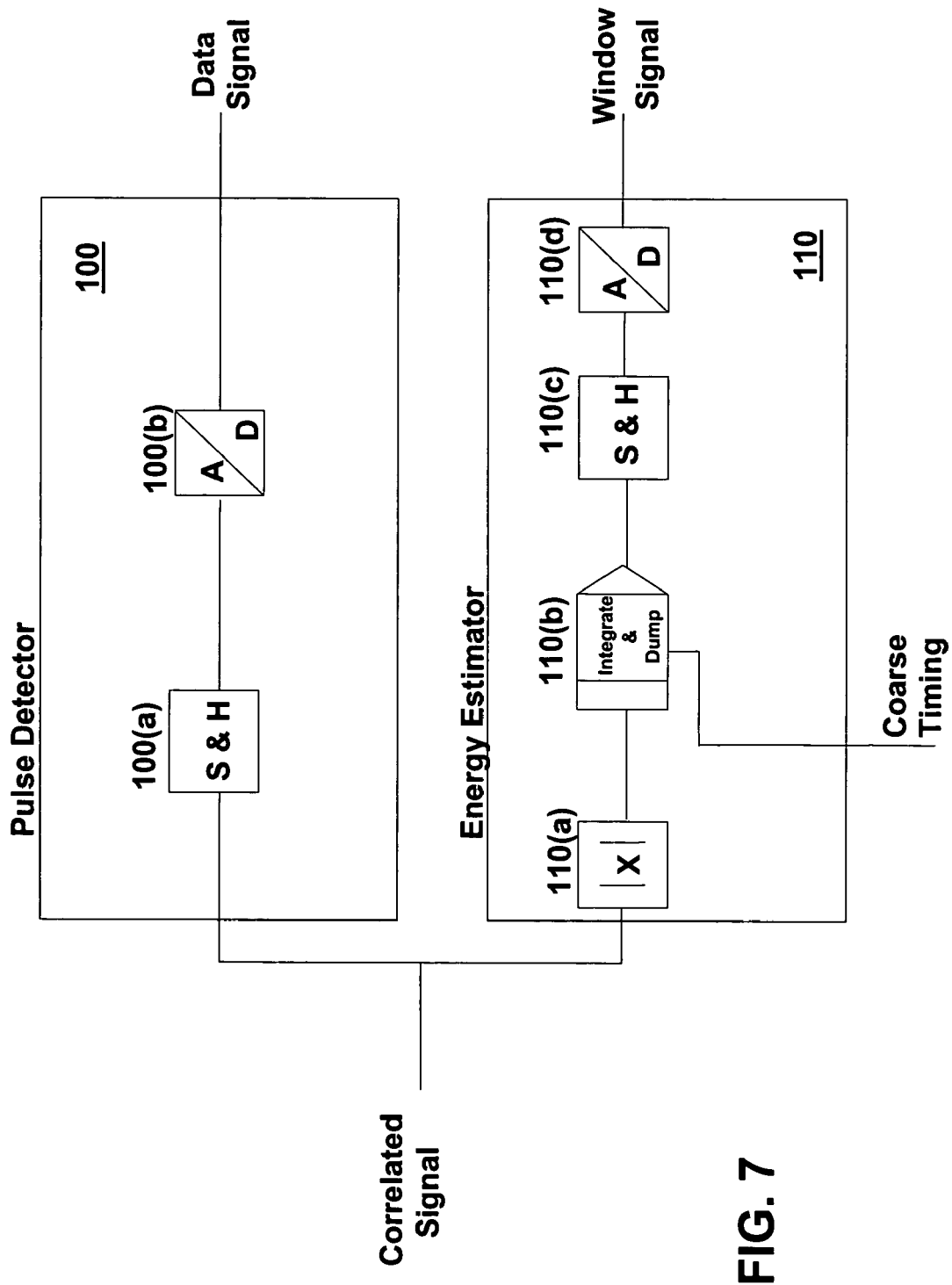
FIG. 7. is an illustration of the pulse detector and energy estimator according to one embodiment of the invention.

Referring to FIGS. 5 and 7, an energy estimator 110 may be used to generate a coarse timing signal. The coarse timing signal may be transmitted to a template generator 120 through a computer microprocessor 130 to improve the time resolution of the template. Additionally, the energy estimator 110 produces a window signal that is transmitted to the microprocessor 130. The energy estimator 110 may include an absolute value detector 110(*a*) that converts a negative portion of a correlated signal into a positive portion. The absolute value detector 110(*a*) may include a square law detector. The energy detector 110 may additionally include an integrate and dump function 110(*b*). The integrate and dump function 110(*b*) sums energy over a fixed time period and outputs a signal corresponding to the amount of energy summed over that time period. In one embodiment of the present invention, the integrate and dump function 110(*b*) may integrate energy sums over a fixed time period that ranges from about 100 picoseconds to about 1 millisecond. According to one embodiment, the fixed time period for the integrate and dump function 110(*b*) is 1 microsecond.

The energy estimator 110 may further include a sample-and-hold function 110(*c*) and an analog-to-digital (A/D) converter 110(*d*). In this embodiment, the sample-and-hold (S&H) function 110(*c*) and A/D converter 110(*d*) may provide a window signal to the microprocessor 130. One purpose of the window signal is to provide a timing reference related to the presence of the incoming signal to the microprocessor 130.

As shown in FIGS. 5 and 7, the pulse detector 100 may include a sample-and-hold function 100(*a*) and an A/D function 100(*b*). The correlated signal may be sampled by the sample-and-hold function 100(*a*) and converted to a digital signal by the A/D function 100(*b*). The correlated signal may carry data that represents the phase, amplitude or time of arrival of the incoming signal. The A/D function 100(*b*) may be multi-level wherein it is capable of producing 2 or more bit resolution from a sample. In a preferred embodiment, the A/D function 100(*b*) is 8-bit per sample. Alternatively, the A/D function 100(*b*) may be 2-bit, 3-bit, 4-bit, 5-bit, 6-bit or 7-bit per sample.

As shown in FIG. 5, the microprocessor 130 receives the data signal from a pulse detector 100 and the window signal from the energy estimator 110. The microprocessor 130 may comprise one or more of: a Digital Signal Processor (DSP); a general-purpose computer processor; or a finite state machine. The microprocessor 130 may further demodulate the data signal to recover the data received.

Figure 8:
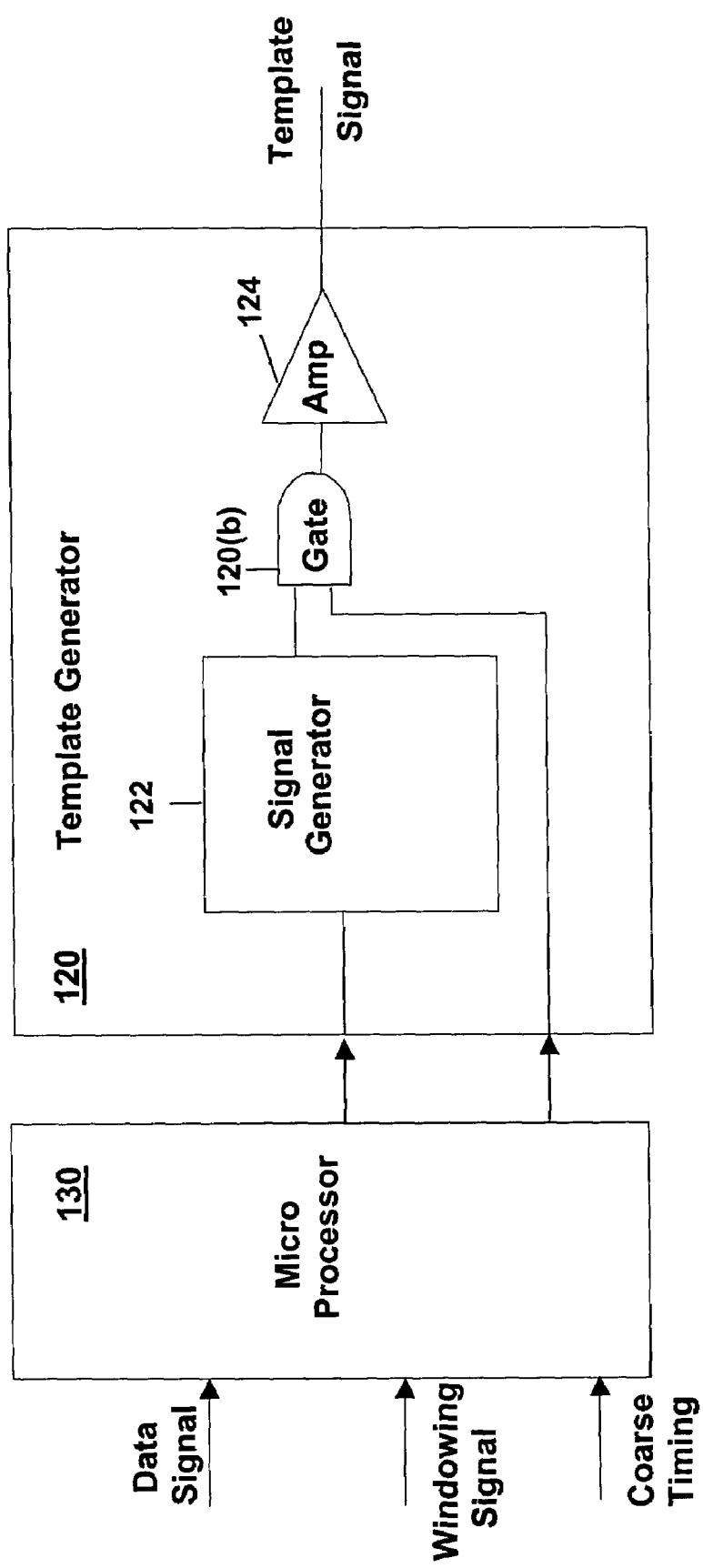
FIG. 8. is an illustration of the microprocessor and template generator according to one embodiment of the invention.

Additionally, as shown in FIGS. 5 and 8, the microprocessor 130 may generate two output signals to the template generator 120. The first output may be based on an input window signal and the coarse timing signal. The coarse timing signal and the window signal inform the microprocessor 130 when an incoming signal has been detected and sets a timeframe for the microprocessor 130 to activate the template generator 120. The second output of the microprocessor 130 may include a clock signal that approximates the phase and frequency of the incoming signal. These signals may be transmitted to the template generator 120.

Referring to FIGS. 5 and 8, the template generator 120 may include a signal generator 122 such as a phase locked loop (PLL), a gating function 120(*b*), and an optional amplifier 124. The signal generator 122 may include components normally present in a PLL such as a Voltage Controlled Oscillator (VCO), filters, and amplifiers to name a few. The signal generator 122 receives the first signal from the microprocessor 130 and generates a signal whose phase and frequency is a function of the signal received from the microprocessor 130. The gating function 120(*b*) allows a time limited template signal to pass when the microprocessor 130 sends the second signal. When the microprocessor 130 determines the coarse timing of an incoming signal it begins to dither the first and second signals to achieve the optimum correlation from the correlator 90. Optimum correlation values are achieved when the frequency of the template signal best matches the frequency of the incoming signal. Minimum correlation values then indicate a phase shift in the data relative to the template, and maximum values indicate no phase shift between template signal and the incoming signal.

Figure 9:
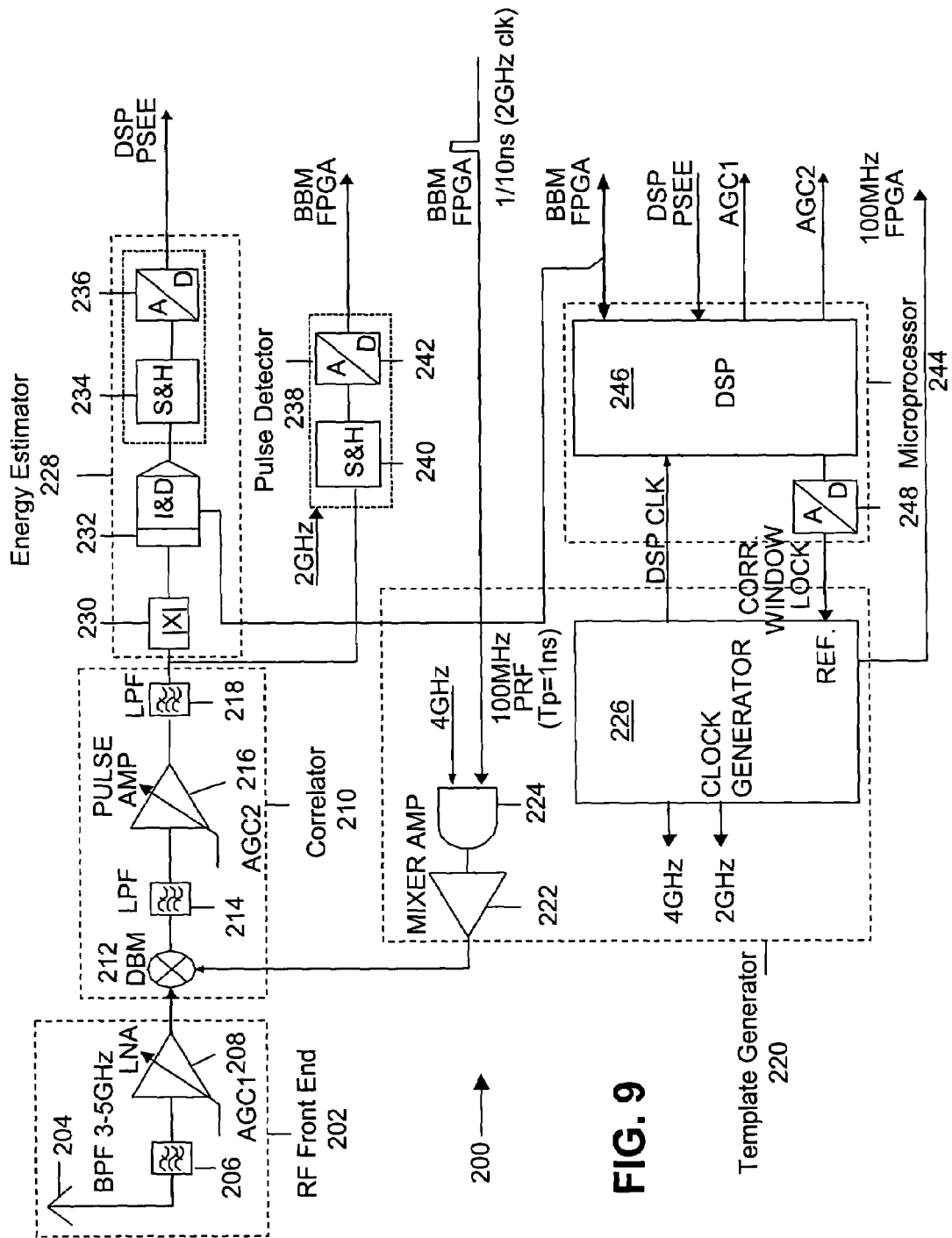
FIG. 9 is an illustration of an overall ultra-wideband receiver according to one embodiment of the invention.

FIG. 9 illustrates an ultra-wideband correlator receiver 200 that uses binary phase shift keying according to one embodiment of the invention. The receiver 200 may include an RF front end 202. The RF front end 202 may include an antenna 204, band-pass filter 206, and amplifier 208. According to one embodiment, the band-pass filter 206 filters signals having a frequency in a range of 3–5 GHz and the amplifier 208 is an automatic gain control (AGC) amplifier.

The RF front end 202 may be in communication with a correlator 210. The correlator 210 may include a mixer 212, a first low-pass filter 214, amplifier 216, and a second low-pass filter 218. According to one embodiment, the amplifier 216 is an AGC amplifier. The correlator 210 receives an incoming signal from the RF front end 202. A template generator 220 generates a local signal that is transmitted to the correlator 210. The template generator 220 may include a mixer amplifier 222, gate 224, and clock generator 226. According to one embodiment, the clock generator 226 may be a phase-locked loop (PLL) synthesizer. It will be appreciated that other components may be added, or substituted for any of the above described components.

The local signal from the template generator 220 is multiplied with the incoming signal from the RF front end 202 by the mixer 212 of the correlator 210. A high frequency component of the resulting signal is attenuated by the first low-pass filter 214. The low frequency component of the resulting signal may be transmitted to the amplifier 216 and subsequently pass through the second low-pass filter 218, yielding a correlated signal. The correlated signal may be transmitted to an energy estimator 228. The energy estimator 228 may include an absolute value detector 230, an integrate-and-dump function 232, a sample-and-hold function 234, and an analog-to-digital function 236. The absolute value detector 230 converts a negative portion of the correlated signal into a positive portion. The absolute value detector 230 may include a square law detector that outputs the square of the incoming signal.

An integrate-and-dump function 232 may be used to sum energy over a fixed period of time and output a signal corresponding to an amount of energy summed over that period. The fixed time period may be, for example, 100 picoseconds to 1 millisecond.

The correlated signal may also be passed to a pulse detector 238. The pulse detector 238 may include a sample-and-hold function 240 and also an analog-to-digital function 242, which may provide a window signal to a microprocessor 244. The correlated signal may be sampled by the sample-and-hold function 240 and converted to a digital signal by analog-to-digital function 242. According to one embodiment, the analog-to-digital converter 242 is a 2, 3, 4, 5, 6, 7, or 8 bit per sample.

The microprocessor 244 may include a digital signal processor 246 and analog-to-digital converter 248. The microprocessor 244 receives a data signal from the pulse detector 238 and the window signal from the energy estimator 228. The data and window signals may be received by the digital signal processor 246 of the microprocessor 244. The microprocessor 244 may demodulate the data signal to recover the data received. The analog-to-digital converter 248 may be used to convert an analog signal to a digital signal.

An output of the microprocessor 244 may be used as input to the template generator 220. The output may include a first output and a second output. The first output may be an input window signal and a coarse timing signal. The coarse timing signal and the window signal may be used to inform the microprocessor 244 when an incoming signal has been detected and set a timeframe for the microprocessor 244 to activate the template generator 220. The second output may be a clock signal that approximates the phase and frequency of the incoming signal. The input window, coarse timing, and clock signals may be transmitted to the template generator 220. It will be appreciated that the correlator receiver 200 may have components added to, removed from, or substituted for any of the above described components to achieve the same, or similar function(s).

Figure 10:
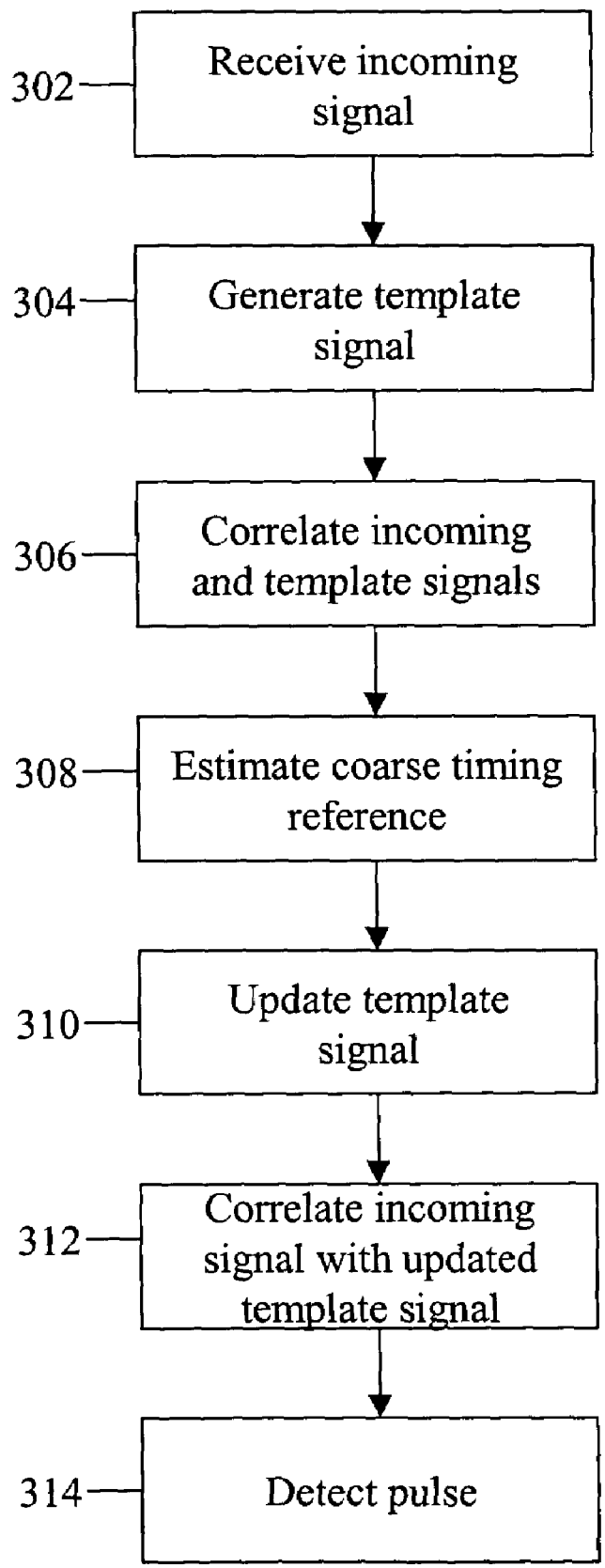
FIG. 10 is a schematic block diagram of a method for receiving ultra-wideband signals according to one embodiment of the invention.

FIG. 10 illustrates a method for receiving ultra-wideband signals according to one embodiment of the invention. In step 302, an incoming signal from a transmitting device may be received. In step 304, a template signal may be generated locally by, for example, a voltage controlled oscillator. Preferably, the template signal is at the same frequency as the incoming signal. In step 306, the incoming signal and the template signal may then be correlated. Correlating may include multiplying the incoming signal and the template signal using, for example, a mixer. The product of the incoming and template signals typically results in a signal having a high frequency component and a low frequency component. Correlation may also include attenuating the high frequency component using, for example, a low-pass filter.

In step 308, a coarse timing reference may be estimated. The coarse timing reference is preferably a signal that may be used to improve the time resolution of the template signal. In step 310, the template signal may be updated using the coarse timing reference. In step 312, the updated template signal and the incoming signal may be correlated. In step 314, an ultra-wideband pulse from the correlated incoming signal and the updated template signal may then be detected.

Figure 11:
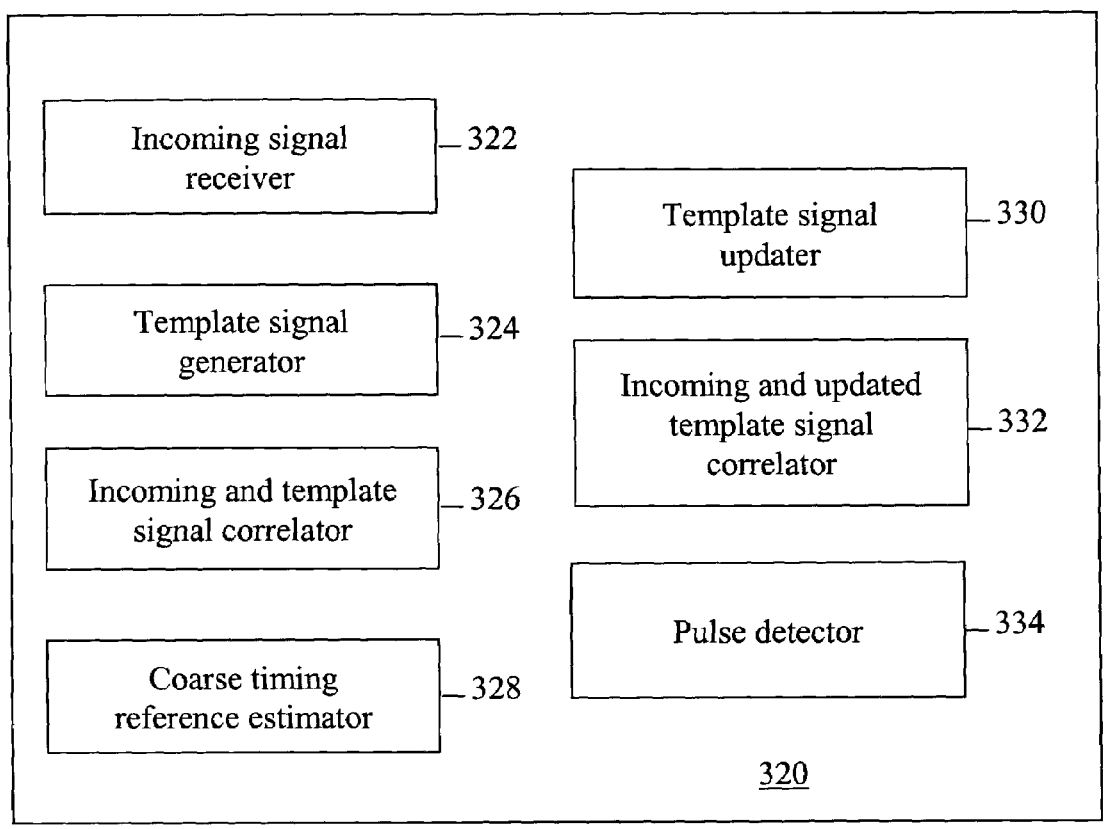
FIG. 11 is a schematic block diagram of a system for receiving ultra-wideband signals according to one embodiment of the invention.

FIG. 11 illustrates a system 320 for receiving ultra-wideband signals according to one embodiment of the invention. The system 320 may include an incoming signal receiver 322, template signal generator 324, incoming signal and template signal correlator 326, coarse timing reference estimator 328, template signal updater 330, incoming and updated template signal correlator 332, and pulse detector 334. The incoming signal receiver 322 may receive one or more transmitted signals using, for example, an antenna. A template signal may be generated using the template signal generator 324. The template signal generated is preferably of the same frequency as the incoming signal. The incoming signal and the template signal may be transmitted to the incoming and template signal correlator 326. The incoming and template signal correlator 326 may be used to correlate the incoming signal with the template signal. The incoming and template signal correlator 326 may multiply the incoming signal and the template signal and attenuate a high frequency component of a resulting signal.

The coarse timing reference estimator 328 may be used to estimate a coarse timing reference that may be used to improve the time resolution of the template signal. The template signal updater 330 may then update the template signal using the coarse timing reference estimated. The updated template signal and the incoming signal may be correlated using the incoming and updated template signal correlator 332. A pulse from the correlated incoming signal and updated template signal may then be detected using pulse detector 334.

One feature of the present invention is to provide a receiver device, or architecture for ultra-wideband (UWB) communications which is capable of receiving and demodulating data that is transmitted using a variety of signal modulation techniques or methods. For example, some of the modulation methods may be: Pulse Amplitude Modulation, On-Off keying, Ternary Modulation, Pulse Position Modulation, and Binary Phase Shift Keying (BPSK). One feature of the present invention is that the multi-level A/D function 100($b$), shown in FIG. 7, allows for the detection of pulse amplitudes. On-Off keying may be demodulated in the present invention by the presence or absence of energy at a specific time. Ternary modulation carries data in unique data groups that always contain a polarity of a pulse and also the absence of a pulse within each data group. Because the present invention can determine the difference between polarities and the time of arrival of the pulse, the microprocessor 130 may demodulate ternary modulation. BPSK carries data in one of two distinct phases and the correlating receiver architecture herein described is capable of demodulating incoming signals with two (2) distinct polarities or phases.

The addition of a second correlator channel may allow for detection and demodulation of signals where four phases are used to carry information. In that situation, amplitude and timing information may be extracted in a similar manner making this alternative architecture suitable for Quadrature Phase Shift Keying (QPSK) and multi-amplitude QPSK both with and without additional PPM.

Thus, many different signal modulation methods may be received and demodulated by the present invention. Ultra-wideband pulse modulation techniques enable a single representative data symbol to represent a plurality of binary digits, or bits. This has an advantage of increasing the data rate in a communications system. A few examples of modulation include Pulse Width Modulation (PWM), Pulse Amplitude Modulation (PAM), and Pulse Position Modulation (PPM). In PWM, a series of predefined UWB pulse widths are used to represent different sets of bits. For example, in a system employing 8 different UWB pulse widths, each symbol could represent one of 8 combinations. This symbol would carry 3 bits of information. In PAM, predefined UWB pulse amplitudes are used to represent different sets of bits. A system employing PAM16 would have 16 predefined UWB pulse amplitudes. This system would be able to carry 4 bits of information per symbol. In a PPM system, predefined positions within a UWB pulse timeslot are used to carry a set of bits. A system employing PPM16 would be capable of carrying 4 bits of information per symbol.

Additional UWB pulse modulation techniques may include: Coded Recurrence Modulation (CRM); Sloped Amplitude Modulation (SLAM); ternary modulation; 1-pulse modulation; and other UWB pulse modulation methods.

For example, in some conventional ultra-wideband (UWB) modulation techniques, a doublet or wavelet "chip" is modulated by a data signal. The data signal imparts a phase to the chip. A "doublet" or "wavelet" in some instances is a positive UWB pulse followed by a negative UWB pulse, or vice-versa. The two UWB pulses include a single chip, which is the smallest element of data in a modulated signal. In this case, the chip, comprising the two UWB pulses, represents a single bit of data (a 1 or a 0). If the data bit being sent is a 0, the chip may start with a positive UWB pulse and end with a negative UWB pulse, and if the data bit being sent is a 1, the chip may start with a negative UWB pulse and end with a positive UWB pulse. For example, in a bi-phasic or antipodal system, the two-pulse "wavelet" or "doublet" or its inverse (180° phase shift) represents a 1 or a 0. Other phase shifts may also be used such as 0°, 90°, 180°, and 270° shifts to develop quad-phasic systems. One element common to these modulation techniques, however, is that a 0 or 1 is represented by at least a positive and a negative pulse of energy. In the bi-phasic or antipodal system described above, a 0 is represented by two pulses of energy—a positive pulse and a negative pulse (or vice-versa). Thus, conventional modulation techniques use energy in the form of at least two UWB pulses having a specific phase (positive or negative) to send each data bit. This type of modulation may be received and demodulated by the present invention.

Another signal modulation method that may be demodulated by the present invention includes transmitting at least one data symbol with every UWB pulse. The data symbol may represent one or more binary digits, or bits.

Thus, it is seen that an apparatus for receiving ultra-wideband signals is provided. The present invention is suitable for both wireless and wire communications media. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent. Many designs other than the above-described embodiments will fall within the literal and/or legal scope of the instant disclosure, and the present invention is limited only by the instant disclosure. It is noted that various equivalents for the particular embodiments discussed in this description may practice the invention as well.

What is claimed is:

1. An ultra-wideband receiver comprising:
    a template generator structured to generate a local signal similar to a plurality of incoming ultra-wideband signals;
    a single correlator structured to correlate the plurality of incoming ultra-wideband signals with the local signal;
    at least one filter in communication with the correlator;
    an energy estimator in communication with the at least one filter; and
    a pulse detector in communication with the at least one filter.

2. The ultra-wideband receiver of claim 1, wherein the template generator comprises:
    a timing signal generator that generates a periodic signal;
    a gate that gates the periodic signal to produce the local signal; and
    an amplifier in communication with the gate.

3. The ultra-wideband receiver of claim 2, wherein the gate is an AND gate.

4. The ultra-wideband receiver of claim 1, wherein the local signal is a pulse of electromagnetic energy.

5. The ultra-wideband receiver of claim 4, wherein the pulse of electromagnetic energy has a duration ranging from about 10 picoseconds to about 1 millisecond.

6. The ultra-wideband receiver of claim 1, wherein the incoming signal comprises a plurality of pulses of electromagnetic energy.

7. The ultra-wideband receiver of claim 6, wherein the plurality of pulses of electromagnetic energy comprise a plurality of ultra-wideband pulses.

8. The ultra-wideband receiver of claim 7, wherein each of the plurality of ultra-wideband pulses has a duration ranging from about 10 picoseconds to about 1 millisecond.

9. The ultra-wideband receiver of claim 1, wherein the incoming signal is modulated by at least one technique selected from a group consisting of: ternary modulation, binary phase shift keying, pulse amplitude modulation, and pulse position modulation.

10. The ultra-wideband receiver of claim 1, wherein the single correlator comprises:
    a first filter;
    a mixer;
    a second filter; and
    an amplifier.

11. The ultra-wideband receiver of claim 10, wherein the first filter has a transfer function similar to a transmitter output filter.

12. The ultra-wideband receiver of claim 10, wherein the first filter is a band-pass filter.

13. The ultra-wideband receiver of claim 10, wherein the mixer is a multiplier configured to multiply the local signal with the incoming signal.

14. The ultra-wideband receiver of claim 10, wherein the second filter is a low-pass filter.

15. The ultra-wideband receiver of claim 10, wherein the amplifier is an automatic gain control amplifier.

16. The ultra-wideband receiver of claim 1, wherein the energy estimator comprises:
    an absolute value detector; and
    an integrator.

17. The ultra-wideband receiver of claim 16, wherein the absolute value detector is a square law detector.

18. The ultra-wideband receiver of claim 16, wherein the integrator is configured to integrate the signal over a predetermined time period.

19. The ultra-wideband receiver of claim 18, wherein the predetermined time period ranges from about 100 nanoseconds to about 1 millisecond.

20. The ultra-wideband receiver of claim 18, wherein the predetermined time period is 1 microsecond.

21. The ultra-wideband receiver of claim 1, wherein the pulse detector comprises:
    a sample-and-hold function; and
    an analog-to-digital converter.

22. The ultra-wideband receiver of claim 21, wherein the analog-to-digital converter is a multi-level analog-to-digital converter.

23. The ultra-wideband receiver of claim 22, wherein the multi-level analog-to-digital converter is selected from a group consisting of: a 2 level analog-to-digital converter, a 4 level analog-to-digital converter, a 6 level analog-to-digital converter, and a 8 level analog-to-digital converter.

24. An ultra-wideband receiver comprising:
a template generator that generates a local signal similar to a plurality of incoming ultra-wideband signals;
a single correlator structured to update the local signal based on the plurality of incoming ultra-wideband signals and recover data;
at least one filter connected to the correlator;
an energy estimator connected to the at least one filter; and
a pulse detector connected to the at least one filter.

* * * * *